US012767547B2

(12) United States Patent
Singh

(10) Patent No.: US 12,767,547 B2
(45) Date of Patent: Oct. 20, 2026

(54) METHOD FOR HEATING A FEED OF NATURAL GAS TO A STEAM REFORMER AND SYSTEM AND USE THEREOF

(71) Applicant: Yara International ASA, Oslo (NO)

(72) Inventor: Udaypal Singh, Babrala (IN)

(73) Assignee: YARA INTERNATIONAL ASA, Oslo (NO)

( * ) Notice: Subject to any disclaimer, the term of this patent is extended or adjusted under 35 U.S.C. 154(b) by 887 days.

(21) Appl. No.: 18/026,989

(22) PCT Filed: Sep. 24, 2021

(86) PCT No.: PCT/EP2021/076299
§ 371 (c)(1),
(2) Date: Mar. 17, 2023

(87) PCT Pub. No.: WO2022/063949
PCT Pub. Date: Mar. 31, 2022

(65) Prior Publication Data

US 2023/0357032 A1 Nov. 9, 2023

(30) Foreign Application Priority Data

Sep. 25, 2020 (IN) ............................. 202011041823
Nov. 10, 2020 (EP) ..................................... 20206677

(51) Int. Cl.
*C01C 1/04* (2006.01)
*C01C 1/02* (2006.01)

(52) U.S. Cl.
CPC ............ *C01C 1/0452* (2013.01); *C01C 1/024* (2013.01); *C01C 1/0482* (2013.01); *C01C 1/0488* (2013.01)

(58) Field of Classification Search
CPC ..... C01C 1/0452; C01C 1/024; C01C 1/0482; C01C 1/0488; C01B 2203/0233;
(Continued)

(56) References Cited

U.S. PATENT DOCUMENTS 4,824,658 A 4/1989 Karafian
6,981,994 B2 * 1/2006 Drnevich ............... C01B 3/382
48/198.1

(Continued)

FOREIGN PATENT DOCUMENTS

CN 101801840 A 8/2010
CN 102137817 A 7/2011

(Continued)

OTHER PUBLICATIONS

Chinese Office Action issued in CN202180054996, dated Nov. 6, 2023, 12 pages.

(Continued)

*Primary Examiner* — Matthew J Merkling
(74) *Attorney, Agent, or Firm* — DILWORTH IP, LLC

(57) ABSTRACT

A method for heating a feed of natural gas, used as feed for a steam reformer of an ammonia production system, wherein the system comprises a steam reformer, operably connected to a heat recovery unit comprising at least two heating coils maintained at a different temperature, wherein the feed of natural gas passes through the at least two heating coils, the method comprising: a) recovering heat in the heat recovery unit from the ammonia production system and b) exchanging at least part of the heat recovered in step a) with at least a portion of the feed of natural gas, thereby obtaining a heated feed of natural gas, wherein the feed of natural gas does not comprise steam.

8 Claims, 3 Drawing Sheets

(58) Field of Classification Search

CPC .... C01B 2203/0283; C01B 2203/0445; C01B 2203/0475; C01B 2203/068; C01B 2203/1241; C01B 2203/127; C01B 2203/1294

See application file for complete search history.

(56) References Cited

U.S. PATENT DOCUMENTS

| | | | | |
|---|---|---|---|---|
| 7,707,837 | B2 | 5/2010 | Inui | |
| 7,988,948 | B2 * | 8/2011 | Guvelioglu | C01B 3/384 423/652 |
| 8,904,970 | B2 | 12/2014 | Von Trotha et al. | |
| 2005/0176831 | A1 | 8/2005 | Inui | |
| 2006/0199051 | A1 * | 9/2006 | Bai | H01M 8/04037 429/441 |
| 2010/0074839 | A1 * | 3/2010 | Drnevich | C10G 2/30 423/655 |
| 2011/0042620 | A1 * | 2/2011 | Singh | B01J 8/04 422/627 |
| 2011/0042621 | A1 | 2/2011 | Price | |
| 2011/0085967 | A1 * | 4/2011 | Raybold | C01B 3/382 422/627 |
| 2017/0096333 | A1 * | 4/2017 | Sakurai | B01J 19/245 |
| 2020/0087576 | A1 | 3/2020 | Marker et al. | |
| 2022/0119269 | A1 * | 4/2022 | Huckman | B01J 19/0053 |

FOREIGN PATENT DOCUMENTS

| | | | |
|---|---|---|---|
| CN | 103025649 | A | 4/2013 |
| CN | 104583121 | A | 4/2015 |
| CN | 111479772 | A | 7/2020 |
| EP | 0227807 | | 7/1987 |
| EP | 2896596 | | 7/2015 |
| EP | 2614033 | B1 | 11/2018 |
| JP | S61127602 | A | 6/1986 |
| WO | 8700081 | | 1/1987 |
| WO | 2015/003830 | A1 | 1/2015 |

OTHER PUBLICATIONS

Extended European Search Report issued in App. No. EP20206677, dated Apr. 29, 2021, 8 pages.

International Search Report and Written Opinion issued in App. No. PCT/EP2021/076299, mailing date Jan. 7, 2022, 14 pages.

Written Opinion issued in App. No. PCT/EP2021/076299, mailing date Apr. 21, 2022, 6 pages.

* cited by examiner

METHOD FOR HEATING A FEED OF NATURAL GAS TO A STEAM REFORMER AND SYSTEM AND USE THEREOF

FIELD

The present disclosure relates to a method for heating a feed of natural gas, used as feed for a steam reformer of an ammonia production system, to a system for performing the method and to the use of the system in performing the method of the disclosure.

BACKGROUND

Ammonia is a compound of nitrogen and hydrogen with the formula $NH_3$. A stable binary hydride, and the simplest nitrogen hydride, ammonia is a colorless gas with a characteristic pungent smell. It is a common nitrogenous waste, particularly among aquatic organisms, and it contributes significantly to the nutritional needs of terrestrial organisms by serving as a precursor to food and fertilizers. Ammonia, either directly or indirectly, is also a building block for the synthesis of many pharmaceutical products and is used in many commercial cleaning products. It is mainly collected by downward displacement of both air and water.

A typical modern ammonia-producing plant first converts natural gas (i.e., methane) or LPG (liquefied petroleum gases such as propane and butane) or petroleum naphtha into gaseous hydrogen. The method for producing hydrogen from hydrocarbons is known as steam reforming. The hydrogen is then combined with nitrogen to produce ammonia via the Haber-Bosch process.

Starting with a natural gas feedstock, the first step of the process used in producing the hydrogen is to remove sulfur compounds from the feedstock, because sulfur deactivates the catalysts used in subsequent steps. Sulfur removal requires catalytic hydrogenation to convert sulfur compounds in the feedstocks to gaseous hydrogen sulfide:

$$H_2+RSH\rightarrow RH+H_2S(gas)$$

The gaseous hydrogen sulfide is then adsorbed and removed by passing it through beds of zinc oxide where it is converted to solid zinc sulfide:

$$H_2S+ZnO\rightarrow ZnS+H_2O$$

Catalytic steam reforming of the sulfur-free feedstock is then used to form hydrogen plus carbon monoxide:

$$CH_4+H_2O\rightarrow CO+3H_2$$

The next step then uses catalytic shift conversion to convert the carbon monoxide to carbon dioxide and more hydrogen:

$$CO+H_2O\rightarrow CO_2+H_2$$

The carbon dioxide is then removed either by absorption in aqueous ethanolamine solutions or by adsorption in pressure swing adsorbers (PSA) using proprietary solid adsorption media.

The final step in producing the hydrogen is to use catalytic methanation to remove any small residual amounts of carbon monoxide or carbon dioxide from the hydrogen:

$$CO+3H_2\rightarrow CH_4+H_2O$$

$$CO_2+4H_2\rightarrow CH_4+2H_2O$$

To produce the desired end-product ammonia, the hydrogen is then catalytically reacted with nitrogen (derived from process air) to form anhydrous liquid ammonia. This step is known as the ammonia synthesis loop (also referred to as the Haber-Bosch process):

$$3H_2+N_2\rightarrow 2NH_3$$

Due to the nature of the (typically multi-promoted magnetite) catalyst used in the ammonia synthesis reaction, only very low levels of oxygen-containing (especially CO, $CO_2$ and $H_2O$) compounds can be tolerated in the synthesis (hydrogen and nitrogen mixture) gas. Relatively pure nitrogen can be obtained by air separation, but additional oxygen removal may be required.

Because of relatively low single pass conversion rates (typically less than 20%), a large recycle stream is required. This can lead to the accumulation of inerts in the loop gas.

The steam reforming, shift conversion, carbon dioxide removal and methanation steps each operate at absolute pressures of about 25 to 35 bar, and the ammonia synthesis loop operates at absolute pressures ranging from 60 to 180 bar depending upon which proprietary design is used.

Steam reforming or steam methane reforming is a method for producing syngas (hydrogen and carbon monoxide) by reaction of hydrocarbons with water. Commonly natural gas is the feedstock. The natural gas is commonly referred to as the feed to the reforming unit. The main purpose of this technology is hydrogen production. The reaction is represented by this equilibrium:

$$CH_4+H_2O\rightleftharpoons CO+3H_2$$

The reaction is strongly endothermic ($\Delta H_r$=206 kJ/mol) and consumes heat.

Steam reforming of natural gas produces 95% of the world's hydrogen of 500 billion $m^3$ in 1998, or 70 million tons by 2018. Hydrogen is used in the industrial synthesis of ammonia and for the production of myriad other chemicals.

The reaction is conducted in a reformer vessel, where a high-pressure mixture of steam and methane are put into contact with a nickel catalyst. Catalysts with high surface-area-to-volume ratio are preferred because of diffusion limitations due to high operating temperature. Examples of catalyst shapes used are spoked wheels, gear wheels, and rings with holes. Additionally, these shapes have a low pressure drop which is advantageous for this application. Catalysts are usually contained in tubes, which constitute a tube section of the reformer, in which natural gas is reformed in order to produce reformed gas, comprising a mixture of carbon monoxide and hydrogen gas. A typical steam methane reformer may contain from 250 to 325 tubes. As stated above, steam methane reforming is an endothermic reaction, hence a fuel gas must be supplied to furnace chamber that is surrounding the tubes of the tube section, in order for heat to be supplied to the natural gas and water as steam inside the tubes, upon burning of the fuel gas. The burning of the fuel gas results in the production of a flue gas that has a temperature ranging from 1000 to 1200° C.

Via the water-gas shift reaction, additional hydrogen can be obtained by treating the carbon monoxide generated by steam reforming with water:

$$CO+H_2O\rightleftharpoons CO_2+H_2$$

This latter reaction is mildly exothermic (produces heat, $\Delta H_r$=−41 kJ/mop. For every tonne of hydrogen produced this way, 9 tonnes of $CO_2$ are also produced. Steam reforming of natural gas is approximately 65-75% efficient.

Production of $H_2$ and CO from hydrocarbon gases (e.g. natural gas) can be performed by two well-known "primary" and "secondary" reformers. Steam methane reforming (SMR) and autothermal reformer (ATR) are two industrial examples of the primary and secondary reformers, respectively. The process of combined reforming utilizes both of primary and secondary tools for production of synthesis gas, as it is commonly practiced in ammonia manufacturing.

Autothermal reforming (ATR) uses oxygen and carbon dioxide or steam in a reaction with methane to form hydrogen. The reaction takes place in a single chamber where the methane is partially oxidized. The reaction is exothermic due to the oxidation. When the ATR uses carbon dioxide the $H_2$:CO ratio produced is 1:1; when the ATR uses steam the $H_2$:CO ratio produced is 2.5:1. The reactions can be described in the following equations, using $CO_2$:

$$2CH_4+O_2+CO_2 \rightarrow 3H_2+3CO+H_2O$$

And using steam:

$$4CH_4+O_2+2H_2O \rightarrow 10H_2+4CO$$

The outlet temperature of hydrogen is between 950-1100° C. and outlet pressure can be as high as 100 bar.

The main difference between SMR and ATR is that SMR only uses air for combustion as a heat source to create steam, while ATR uses purified oxygen.

As described above, considering that steam methane reforming is an endothermic reaction and that that steam reforming of natural gas is approximately 65-75% efficient, solutions are required to utilize the energy provided by the flue gas produced in the reformer, in the form of heat, in the most efficient way. This not only is necessary to avoid wasting energy but also to ensure that the flue gas does not come out of the stack of the steam reformer at a temperature that is too high, in other words to ensure that the flue gas in the stack of the reformer meets the design specifications of the stack.

In addition to supplying sufficient heat to the mixture of steam and methane to be reacted in the tube section of the reformer, also the amount of heat provided and the distribution of the heat inside the steam reformer should be optimized, in order to ensure the proper heat balance between the tube section and the furnace of the reformer.

PRIOR ART

In JP61127602A (JGC Corp), a two-stage reforming process is disclosed, utilizing a medium temperature steam reformer, operated at a temperature ranging from 520 to 620° C., and a high temperature steam reformer, operating at a temperature ranging from 800 to 850° C. The flue gas produced in the furnace of the high temperature reformer is used to pre-heat a natural gas/steam mixture fed to the medium temperature reformer and also to supply heat to the high temperature reformer. The reformed gas produced in the medium temperature reformer does not contain olefins and can, therefore, be supplied to the reforming reactor, thereby reducing the heat load required for the heating furnace of the high temperature steam reformer. It is also possible to preheat only the steam, mix this with the raw material hydrocarbons, and supply this to the medium temperature steam reforming reactor. Similarly, instead of preheating only steam, the raw material hydrocarbons can be preheated together with steam.

EP2896596A1 (Mitsubishi Heavy Industries, Ltd.), relates to a reforming device that reforms a natural gas as a fuel of a reformer for reforming the natural gas or the like. A setup is disclosed wherein a natural gas line passes through two heat exchangers before being mixed with steam and supplied to the reforming unit. In the first heat exchanger, the hot fluid stream is made up of part of the heated natural gas itself. D1 further discloses the use of multiple heat exchangers in using the flue gas, however not specifically for heating up the natural gas.

EP0227807A1 (Stone & Webster Engineering Corporation) relates to a process and system for the production of hydrogen-rich gas by the steam reforming of hydrocarbons by indirect heat exchange. The hydrocarbons are heated by one or more heat exchanger. Prior to a first heat exchange, a hydrocarbon feed is split in a first part and a second part. The first part is passed through a first preheater and subsequently lead to a desulfurization unit and mixed with steam. The second part is passed through a second preheater and is then lead as a fuel gas to the burners of a furnace for reforming the hydrocarbons. Hence, the natural feed gas is heated by two heat exchangers in a parallel setup.

US2011/0042612A1 (Price Arthur Joseph) relates to apparatus, systems, and processes for producing syngas. It discloses a method for heating a natural gas feed stream, particularly via first heating coils situated in the exhaust of a furnace, thus providing a preheated gas stream, which is split in a first natural gas stream and a second natural gas stream, possibly after desulfurization. Steam may be introduced in the first and second natural gas streams. Hence, these streams may contain steam.

U.S. Pat. No. 7,707,837B2 (Hitachi, Ltd) relates to a steam reforming system wherein flue gases of a gas turbine are used to preheat feed streams supplied to the reformer. In particular, the flue gases of the turbine are provided to a heat exchanger comprising multiple preheaters and heaters. A naphtha feed is preheated via preheater, and is further heated via a heater downstream of a desulfurization column. Steam is introduced after the desulfurization column and prior to the second heater.

Therefore, solutions exist for utilizing the heat from the flue gas of a reformer for heating the steam or the natural gas/steam mixture directly supplied to a reformer, or for supplying heat to the furnace of a reformer. However, none of the solutions presented in the prior art are based upon the multiple step heating, through the use a flue gas, of a steam-free natural gas. There are also solutions in which available heat is utilized further downstream to the reformer and in the treatment of the natural gas prior to any mixing with another stream. There nonetheless remains a need for the solution to utilize available heat such as to condition both the feed of natural gas and the fuel going to the steam reformer, in order to ensure the proper heat balance between the tube section and the furnace of the reformer. The present disclosure presents a solution to address those needs.

SUMMARY

In a first aspect of the disclosure, a method is disclosed for heating a feed of natural gas that does not comprise steam and is used as feed for a steam reformer of an ammonia production system. The system comprises a steam reformer, operably connected to a heat recovery unit comprising at least two heating coils maintained at a different temperature, wherein the feed of natural gas passes through the at least two heating coils. The method comprises the steps of:

a) recovering heat in the heat recovery unit from the ammonia production system; and b) exchanging at least part of the heat recovered in step a) with at least a portion of the feed of natural gas, thereby obtaining a heated feed of natural gas;

the method being characterised in that:

the heat recovered in step a) is heat recovered from flue gas (2) produced in the steam reformer (19) and;

step b) comprises the consecutive steps of:

b1) heating the feed of natural gas (1) from a temperature ranging from 10° C. to 40° C. to a temperature ranging from 180° C. to 210° C. upon contacting the feed (1) with a first heating coil (4) of the heat recovery unit (3), thereby obtaining a pre-heated feed of natural gas (9); and b2) subsequently further heating the pre-heated feed of natural gas (9) from step b1) to a temperature ranging from 360° C. to 380° C. upon contacting the feed (9) with a second heating coil (5) of the heat recovery unit (3), thereby obtaining the heated feed of natural gas (10).

As defined herein, natural gas is methane or a liquefied petroleum gases such as propane and butane, or petroleum naphtha. In steps b1) and b2), the heating of the natural gas and the pre-heated feed of natural gas, respectively, uses heat recovered in step a) from the flue gas produced in the steam reformer. In particular, both the feed of natural gas as well as the pre-heated feed of natural gas do not comprise steam.

According to one embodiment of the method of the disclosure, the method further comprises the step of:

c) splitting the pre-heated feed of natural gas obtained in step b1) into a pre-heated feed stream fed to the second heating coil of the heat recovery unit and a gas stream having a temperature ranging from 180° C. to 210° C. used as fuel in the steam reformer.

According to one embodiment of the method of the disclosure, the gas stream having a temperature ranging from 180° C. to 210° C. used as fuel in the steam reformer obtained from step c) is further mixed with natural gas.

According to one embodiment of the method of the disclosure, the method further comprises the steps of:

d) supplying the heated feed of natural gas to a sulfur removal unit, thereby obtaining sulfur-depleted natural gas;

e) mixing the sulfur-depleted natural gas obtained in step d) with steam in a steaming unit, thereby obtaining a natural gas/steam mixture;

f) heating the natural gas/steam mixture obtained in step e) from a temperature ranging 360° C. to 380° C. to a temperature ranging from 590° C. to 610° C. in a heating unit, thereby obtaining a heated natural gas/steam mixture; and g) supplying the heated natural gas/steam mixture obtained in step f) to the steam reformer, thereby forming a reformed gas, comprising at least hydrogen and carbon monoxide.

According to one embodiment of the method of the disclosure, the method further comprises the steps of:

h) reacting the reformed gas, reformed in the steam reformer in a shift conversion unit, thereby producing a mixture of carbon dioxide and hydrogen;

i) reacting the gas obtained from the reaction in the shift conversion unit in a carbon dioxide removal unit, thereby separating hydrogen from carbon dioxide;

j) reacting the gas obtained from the carbon dioxide removal unit in a methanation unit, thereby converting remaining amounts of carbon monoxide and carbon dioxide in the hydrogen into methane, thereby producing hydrogen gas essentially free in carbon monoxide and carbon dioxide; and k) reacting the gas obtained from the reaction in the methanation unit in an ammonia synthesis unit, thereby producing ammonia.

In a second aspect of the disclosure, a system is disclosed for heating a feed of natural gas, used as feed for a steam reformer of an ammonia production system. The system for heating comprises:

a heat recovery system for recovering heat, comprising an inlet and an outlet and at least two heating coils maintained at a different temperature for exchanging part of the recovered heat with at least a portion of the feed of natural gas, thereby providing a heated feed of natural gas;

a steaming unit, comprising an inlet in fluid communication with the heated feed of natural gas and an outlet; and a steam reformer, comprising an inlet for the heated feed of natural gas in fluid communication with the heated feed of natural gas, and an outlet for a flue gas;

wherein the heat recovery unit is positioned upstream the steaming unit, and wherein the system is further characterised in that:

the flue gas outlet (21) of the steam reformer (19) is in fluid or thermal communication with the heating coils (4, 5) of the heat recovery system (3), such that heat is recovered from the flue gas (2) produced in the steam reformer (19) and;

a first heating coil (4) is configured for heating the feed of natural gas (1) from a temperature ranging from 10° C. to 40° C. to a temperature ranging from 180° C. to 210° C., thereby providing a pre-heated feed of natural gas (9), and a second heating coil (5) is configured for heating the pre-heated feed of natural gas (9) from a temperature ranging from 180° C. to 210° C. to a temperature ranging from 360° C. to 380° C., thereby providing a heated feed of natural gas (10), and the first heating coil (4) is located upstream the second heating coil (5).

According to one embodiment of the system of the disclosure, the system further comprises means for splitting the pre-heated feed of natural gas heated by a first heating coil into a pre-heated feed stream to the second heating coil and a gas stream having a temperature ranging from 180° C. to 210° C. used as fuel in the steam reformer.

Means for splitting can be selected from the non-exhaustive list comprising pressure release valves, gas splitters and “T-tubes”.

According to one embodiment of the system of the disclosure, the system further comprises means for mixing the gas stream having a temperature ranging from 180° C. to 210° C. used as fuel in the steam reformer with natural gas.

Means for mixing can be selected from the non-exhaustive list comprising pressure release valves, gas splitters and “T-tubes”.

According to one embodiment of the system of the disclosure, the system further comprises:

a sulfur removal unit for removing sulfur from the feed of natural gas heated by the second heating coil, comprising an inlet and an outlet;

a steaming unit (15), having an inlet (16) and an outlet (17); and a heating unit for heating a natural gas/steam mixture from a temperature ranging from 360° C. to 380° C. to a temperature ranging from 590° C. to 610° C., and comprising an inlet and an outlet;

wherein the inlet of the sulfur removal unit is in fluid communication with the outlet of the heat recovery unit, and wherein the inlet of the steaming unit is in fluid communication with the outlet of the sulfur removal unit, and wherein the outlet of the steaming unit is in fluid communication with the inlet of the heating unit, and wherein the outlet for the heating unit is in fluid communication with the inlet for the heated feed of natural gas of the steam reformer.

According to one embodiment of the system of the disclosure, the system further comprises:

a shift conversion unit for reacting carbon monoxide gas produced in the steam reformer with water, thereby producing a mixture of carbon dioxide and hydrogen, in direct fluid communication with the steam reformer;

a carbon dioxide removal unit in direct fluid communication with the shift conversion unit, for separating hydrogen from carbon dioxide gas in the mixture of carbon dioxide and hydrogen formed in the shift conversion unit;

a methanation unit in direct fluid communication with the carbon dioxide removal unit for converting amounts of carbon monoxide gas formed in the steam reformer and of carbon dioxide formed in the shift conversion unit remaining in the hydrogen gas into methane, thereby providing hydrogen gas essentially free in carbon monoxide and carbon dioxide; and an ammonia synthesis unit for reacting the hydrogen gas provided by the methanation unit with nitrogen gas, thereby forming ammonia, in direct fluid communication with the methanation unit.

In a third aspect of the disclosure is disclosed the use of the system of the disclosure for heating, according to the method of the disclosure, a feed of natural gas used as feed for a steam reformer of an ammonia production system.

LIST OF FIGURES

LIST OF NUMERALS IN FIGURES

Figure 1:
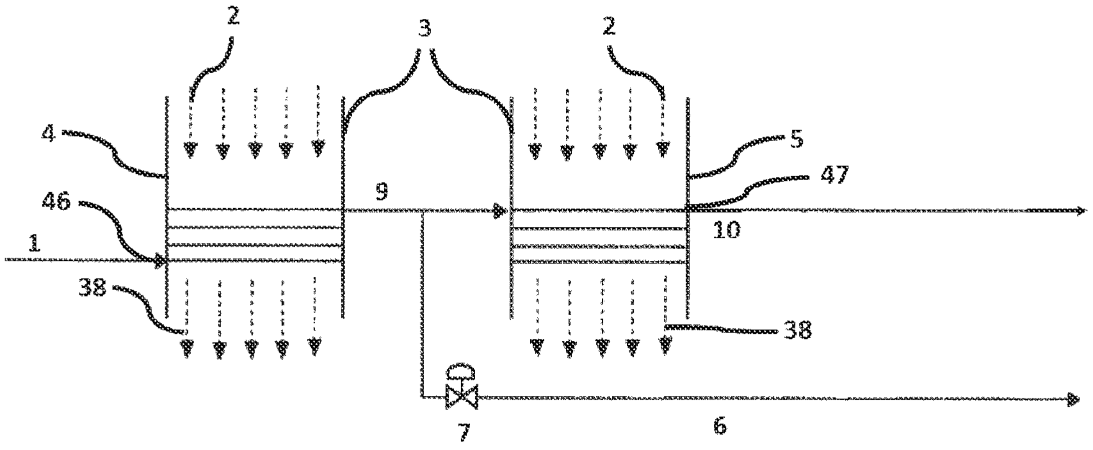
FIG. 1 shows a schematic representation of one embodiment of the system of the disclosure for heating a feed of natural gas (1)

| | |
|---|---|
| 1 | feed of natural gas |
| 2 | flue gas |
| 3 | heat recovery unit |
| 4 | first heating coil |
| 5 | second heating coil |
| 6 | gas stream having a temperature ranging from 180° C. to 210° C. |
| 7 | means for splitting a heated feed of natural gas |
| 8 | means for mixing a heated gas stream with natural gas |
| 9 | pre-heated feed of natural gas |
| 10 | heated feed of natural gas |
| 11 | sulfur removal unit |
| 12 | inlet of sulfur removal unit |
| 13 | outlet of sulfur removal unit |
| 14 | sulfur-depleted natural gas |
| 15 | steaming unit |
| 16 | inlet of steaming unit |
| 17 | outlet of steaming unit |
| 18 | natural gas/steam mixture |
| 19 | steam reformer |

-continued

| | |
|---|---|
| 20 | inlet for natural gas of steam reformer |
| 21 | outlet for flue gas from steam reformer |
| 22 | reformed gas |
| 23 | outlet for reformed gas from steam reformer |
| 24 | shift conversion unit |
| 25 | inlet of shift conversion unit |
| 26 | outlet of shift conversion unit |
| 27 | gas mixture of carbon dioxide and hydrogen |
| 28 | carbon dioxide removal unit |
| 29 | inlet of carbon dioxide removal unit |
| 30 | outlet for carbon dioxide removal unit |
| 31 | Hydrogen |
| 32 | methanation unit |
| 33 | inlet for methanation unit |
| 34 | outlet for methanation unit |
| 35 | hydrogen gas essentially free in carbon monoxide and carbon dioxide |
| 36 | ammonia synthesis unit |
| 37 | inlet of ammonia synthesis unit |
| 38 | flue gas to stack of steam reformer |
| 39 | ammonia production system |
| 40 | second heated gas stream |
| 41 | heating unit |
| 42 | heated natural gas/steam mixture |
| 43 | inlet of heating unit |
| 44 | outlet of heating unit |
| 45 | Ammonia |
| 46 | inlet of heat recovery system |
| 47 | outlet of heat recovery system |
| 48 | Water |
| 49 | nitrogen gas |
| 50 | tube section of steam reformer |
| 51 | fuel section of steam reformer |
| 52 | stack of steam reformer |
| 53 | secondary reformer |
| 54 | Air |

DETAILED DESCRIPTION

Throughout the description and claims of this specification, the words “comprise” and variations of them mean “including but not limited to”, and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties, or groups described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed.

The enumeration of numeric values by means of ranges of figures comprises all values and fractions in these ranges, as well as the cited end points. The term “from . . . to” as used when referring to a range for a measurable value, such as a parameter, an amount, a time period, and the like, is intended to include the limits associated to the range that is disclosed.

Figure 2:
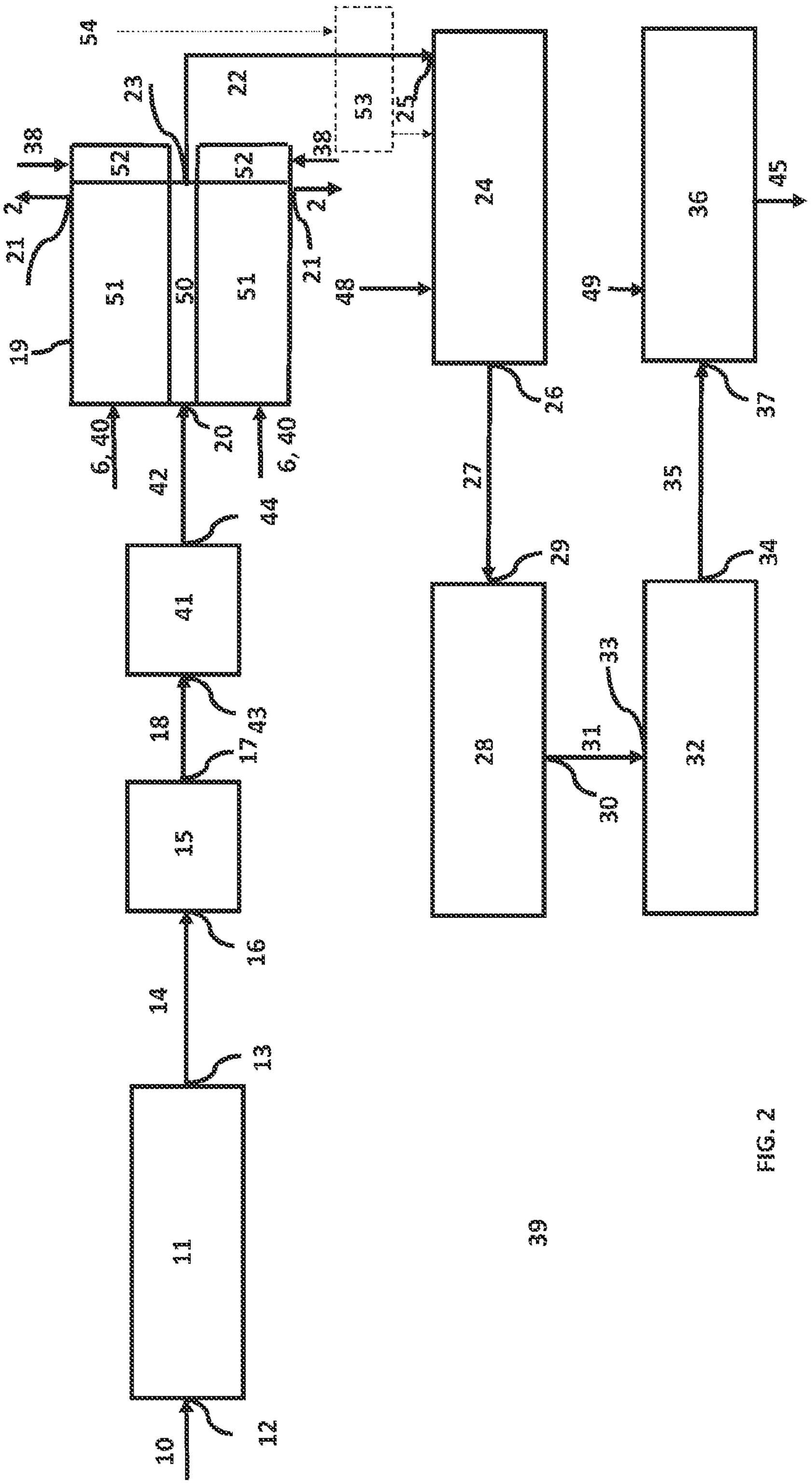
FIG. 2 shows a flow diagram representation of the method of the disclosure for processing a heated feed of natural gas (10, 40) in an ammonia production system (39)
Figure 3:
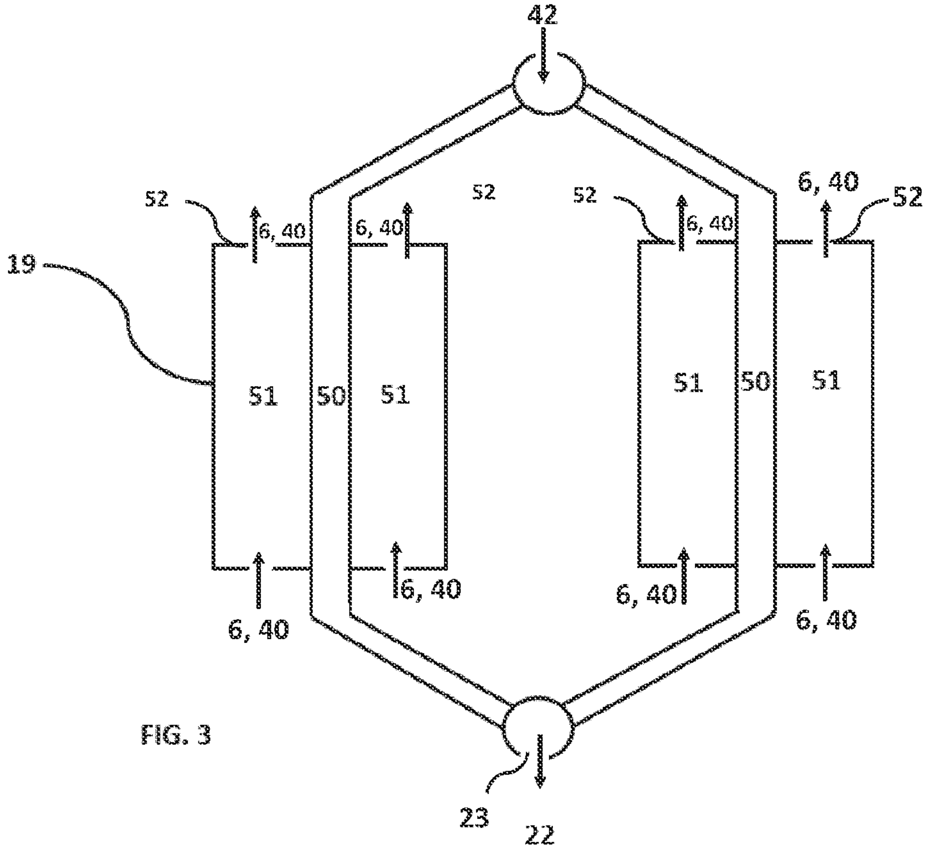
FIG. 3 shows a schematic representation of a primary reformer (19)

Reference is made to FIGS. 1 to 3. In a first aspect of the disclosure, a method is disclosed for heating a feed of natural gas 1 that does not comprise steam and is used as feed for a steam reformer 19 of an ammonia production system 39. The system comprises a steam reformer 19 operably connected to a heat recovery unit 3 comprising at least two heating coils 4 and 5 maintained at a different temperature, wherein the feed of natural gas passes through the at least two heating coils 4 and 5. The method comprises the steps of:

a) recovering heat in the heat recovery unit 3 from the ammonia production system 39; and b) exchanging at least part of the heat recovered in step a) with at least a portion of the feed of natural gas 1, thereby obtaining a heated feed of natural gas 10. Since the feed of natural gas 1 does not comprise steam, in the method of the disclosure, at least a portion of the feed of natural gas 1 is heated in a heat recovery unit 3, before being mixed with steam in the steaming unit 15, typically positioned downstream of the heat recovery unit comprising the at least two heating coils (4,5) and being reacted in the steam reformer 19. As a result of this heat exchange step, a heated feed of natural gas 10 is obtained. This heated feed of natural gas 10 can then in turn be used as a source of energy such as the supply of heat in a heat exchange, thereby distributing in turn the heat in the ammonia production system 39. Alternatively, the heated feed of natural gas 10 can be mixed with natural gas at a different temperature, such that a feed at a pre-determined temperature can be obtained downstream the steaming unit 15, such that, in turn, a natural gas/steam mixture 42 at an optimal temperature is obtained before the reaction in the steam reformer 19. When the temperature of a mixture comprising the heated feed of natural gas is measured, it is possible to regulate, for example through a valve system, the amount of the initial feed of natural gas that goes through the heat exchange step b). Said otherwise, the method of the disclosure not only allows an optimal distribution of the heat recovered in the ammonia production system 39, it also ensures that the feed of the natural gas 1 is at an optimal temperature when reacted in the steam reformer 19. Such optimal temperature not only is necessary to ensure proper conversion of the natural gas 1 into a reformed gas, that is a mixture of carbon monoxide and hydrogen 22, it further optimizes the lifetime of the steam reformer 19 by minimizing the damages when the gases is at a too low or too high temperatures. Indeed, when the feed of natural gas 10 or 42 to the steam reformer 19 is at a too low temperature, additional heat may have to be provided by the furnace chamber 51, resulting in additional energy consumption and potential damages of the furnace chamber 51 when working at higher temperatures. In the event that the feed of natural gas to the steam reformer 10 or 42 is at a too high temperature, heating by the furnace chamber 51 may result in the natural gas in the tube section 50 reaching a temperature that is higher than that the design temperature of the tubes of the tube section 50, resulting in tubes damages and leakages between the furnace chamber 51 and the tube 50 sections.

In order to maximize the surface area and, hence, the exchange of heat in the heat exchange system 2, the heat exchange system 2 of the disclosure comprises at least two heating coils 4 and 5. The heating coils 4 and 5 afford a good surface area. In addition, the presence of multiple heating coils 4 and 5 allows for the multiple step, serial heating of the feed of natural gas 1 and, thereby, enhances the control of the temperature of the feed of natural gas 10.

Furthermore, the heat recovered in step a) is heat recovered from flue gas 2 coming out of the steam reformer 19 (FIG. 1). The flue gas is thus in thermal communication with all of the at least two heating coils 4 and 5.

As the temperature of the flue gas 2 in the furnace chamber 51 of the steam reformer 19 is as high as 1000° C., this flue gas 2 is a particularly suitable source of heat to be provided to the heat exchange system 3, in order for heat to be provided to the feed of natural gas 1. In addition, the stack 52 of the steam reformer 19 may be designed to handle temperatures not higher than 150° C. This means that it may be, in any event, necessary to recover the heat of the flue gas 2 before it is sent to the stack 52, through the use of fan (not shown) typically located at the bottom of the steam reformer 19 due to its weight. Therefore, the use of the flue gas 2 for recovering heat in the heat recovering system 3 presents the benefit of ensuring that the temperature of the flue gas 38 going to the stack 52 is not higher than the temperature that the stack 52 has been designed for.

In addition, the step b) of the method comprises the consecutive steps of (FIG. 1):

b1) heating the feed of natural gas 1, particularly containing no steam, from a temperature ranging from 10° C. to 40° C. to a temperature ranging from 180° C. to 210° C. upon contacting the feed 1 with a first heating coil 4 of the heat recovery unit 3, particularly using heat recovered from the flue gas, thereby obtaining a pre-heated feed of natural gas 9; and b2) subsequently further heating the pre-heated feed of natural gas 9, particularly containing no steam, from step b1) to a temperature ranging from 360° C. to 380° C. upon contacting the feed 9 with a second heating coil 5 of the heat recovery unit 3, particularly using heat recovered from the flue gas, thereby obtaining the heated feed of natural gas 10.

As described above, heating of the natural feed gas 1 in several steps presents the advantage of enhanced control on the temperature of the feed of natural gas 10 or 42 entering the steam reformer 19. In addition, the pre-heated feed of natural gas 9 can be used as a source of energy supply, for example through heat exchange or mixing with other gases, as will be illustrated in the next embodiment. Hence, the multiple step heating process of the feed of natural gas 1 one also offers the benefit of optimal heat distribution throughout the entire ammonia production system 39.

Figure 4:
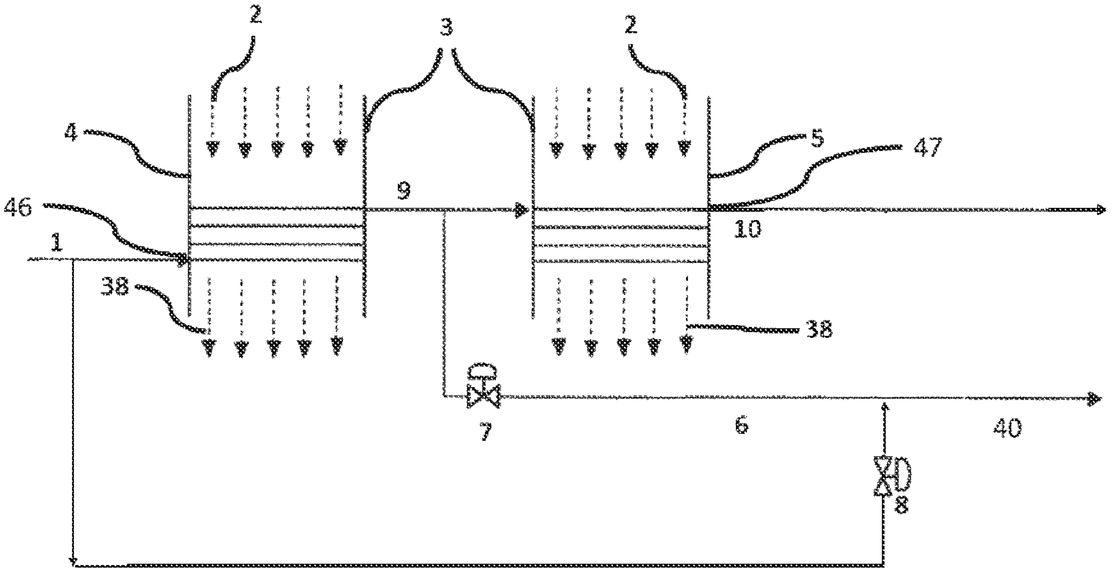
FIG. 4 shows a schematic representation of another embodiment of the system of the disclosure for heating a feed of natural gas (1)

Reference is made to FIGS. 1, 2 and 4. According to one embodiment of the method of the disclosure, the method further comprises the step of:

c) splitting the pre-heated feed of natural gas 9 obtained in step b1) into a pre-heated feed stream fed to the second heating coil 5 of the heat recovery unit 3 and a gas stream 6 having a temperature ranging from 180° C. to 210° C. used as fuel in the steam reformer 19.

As described above, it is possible to use the pre-heated feed of natural gas 9 as a source of energy supply. By splitting the pre-heated feed of natural gas 9, a gas stream 6 at a temperature ranging from 180° C. to 210° C. can be obtained which is suitable for feeding to the furnace chamber 51 of the steam reformer 19. Consequently, no separate heating device is required for heating the gas fed as fuel 6 to the furnace chamber 51 of the steam reformer 19. Moreover, the method of the disclosure not only allows for controlling the temperature of the feed gas 10 or 42 to the steam reformer 19, it further allows to obtain a gas stream 6 at a temperature ranging from 180° C. to 210° C. suitable as fuel in the furnace chamber 51 of the steam reformer 19, as well as the control of the temperature of the gas stream 6, at a temperature ranging from 180° C. to 210° C. and used as fuel gas. This may be of particular importance in ammonia production systems 39, comprising steam reformers 19 made of multiple parallel units (not shown), each unit comprising a furnace chamber 51 and a tube section 50: in such systems, a problem that may be faced is the unequal heat distribution between the different units of the steam reformer. Controlling both temperatures of the heated feed of natural gas 10 and of the gas stream 6 and of the gas stream 40 brings a solution for controlling this problem.

Reference is made to FIG. 4. According to one embodiment of the method of the disclosure, the gas stream having a temperature ranging from 180° C. to 210° C. used as fuel 6 in the steam reformer 19 obtained from step c) is further mixed with natural gas. As an extension to the previous embodiment, the method of the disclosure allows for further control of the temperature and of the volume of gas 40 to fed as fuel to the furnace chamber 51 of the steam reformer 19.

Reference is made to FIG. 2. According to one embodiment of the method of the disclosure, the method further comprises the steps of:

d) supplying the heated feed of natural gas 10 to a sulfur removal unit 11, thereby obtaining sulfur-depleted natural gas 14;

e) mixing the sulfur-depleted natural gas 14 obtained in step d) with steam in a steaming unit 15, thereby obtaining a natural gas/steam mixture 18;

f) heating the natural gas/steam mixture 18 obtained in step e) from a temperature ranging 360° C. to 380° C. to a temperature ranging from 590° C. to 610° C. in a heating unit 41, thereby obtaining a heated natural gas/steam mixture 42; and g) supplying the heated natural gas/steam mixture 42 obtained in step f) to the steam reformer 19, thereby forming a reformed gas 22, comprising at least hydrogen and carbon monoxide.

This embodiment of the method will enable the person skilled in the art to use the heated feed of natural gas 1 to produce a reformed gas, comprising a mixture of carbon monoxide and hydrogen 22. It will be evident to the person skilled in the art that, optionally, an additional step before step d) can be conducted and in which the heated feed of natural gas 10 is reacted with air 54, as a source of oxygen, in a secondary reformer 53, in order to further increase the conversion of the natural gas into the reformed gas 22, comprising hydrogen and carbon monoxide. The gas leaving the secondary reformer 53 can then be fed to the shift conversion unit 24.

Reference is made to FIG. 2. According to one embodiment of the method of the disclosure, the method further comprises the steps of:

h) reacting the reformed gas 22, reformed in the steam reformer 19 in a shift conversion unit 24, thereby producing a mixture of carbon dioxide and hydrogen 27;

i) reacting the gas 27 obtained from the reaction in the shift conversion unit 24 in a carbon dioxide removal unit 28, thereby separating hydrogen 31 from carbon dioxide;

j) reacting the gas 31 obtained from the carbon dioxide removal unit 28 in a methanation unit 32, thereby converting remaining amounts of carbon monoxide and carbon dioxide in the hydrogen 31 into methane, thereby producing hydrogen gas essentially free in carbon monoxide and carbon dioxide 35; and k) reacting the gas 35 obtained from the reaction in the methanation unit in an ammonia synthesis unit 36, thereby producing ammonia 45.

This embodiment of the method will enable the person skilled in the art to use the heated feed of natural gas 1 to produce ammonia 45. The supply of nitrogen gas 49 to the ammonia synthesis unit 36, also commonly known as the Haber Bosch synthesis, is necessary in order for the hydrogen gas essentially free in carbon monoxide and carbon dioxide 35 to react with nitrogen 49 in the ammonia synthesis unit 36, thereby producing ammonia 45. Nitrogen gas 49 can be supplied to the ammonia synthesis unit 36 for example through an air separation unit (not shown) that splits or separates the oxygen in the air from nitrogen gas 49. Alternatively, if as described in relation to the previous embodiment, an additional step before step d) is conducted in which the heated feed of natural gas 10 is reacted with air 54, in a secondary reformer 53, nitrogen gas 49 is then supplied to the ammonia synthesis through the air 54 supplied to the secondary reformer 53.

Reference is made to FIGS. 1 to 3. In a second aspect of the disclosure, a system is disclosed for heating a feed of natural gas 1, used as feed for a steam reformer 19 of an ammonia production system 39. The system for heating comprises:

a heat recovery system 3 for recovering heat, comprising an inlet 46 and an outlet 47 and at least two heating coils 4 and 5 maintained at a different temperature for exchanging part of the recovered heat with at least a portion of the feed of natural gas 1, thereby providing a heated feed of natural gas 10;

a steaming unit 15, comprising an inlet 16 in fluid communication with the heated feed of natural gas 10 and an outlet 17; and a steam reformer 19, comprising an inlet for the heated feed of natural gas 20 in fluid communication with the heated feed of natural gas 10, and an outlet for a flue gas 21; wherein the heat recovery unit 3 is positioned upstream the steaming unit 15.

Since the heat recovery unit 3 is positioned upstream the steaming unit 15, at least a portion of the feed of natural 1 is heated in this heat recovery unit 3, before being mixed with steam in the steaming unit 15 and being reacted in the steam reformer 19. As a result of this heat exchange step, a heated feed of natural gas 10 is obtained, downstream of the steaming unit. This heated feed of natural gas 10 can then in turn be used as a source of energy such as the supply of heat in a heat exchange, thereby distributing in turn the heat in the ammonia production system 39. Alternatively, the heated feed of natural gas 10 can be mixed with natural gas at a different temperature, such that a feed at a pre-determined temperature can be obtained upstream the steaming unit 15, such that, in turn, a natural gas/steam mixture 42 at an optimal temperature is obtained before the reaction in the steam reformer 19. When the system comprises means for measuring the temperature (not shown) of a mixture comprising the heated feed of natural gas, it is possible to regulate, for example through a valve system, the amount of the initial feed of natural gas that goes through the heat exchange step b). Said otherwise, the system of the disclosure not only allows an optimal distribution of the heat recovered in the ammonia production system 39, it also ensures that the feed of the natural gas 1 is at an optimal temperature when reacted in the steam reformer 19. Such optimal temperature not only is necessary to ensure proper conversion of the natural gas 1 into a reformed gas, that is a mixture of carbon monoxide and hydrogen 22, it further optimizes the lifetime of the steam reformer 19 by minimizing the damages when the gases is at a too low or too high temperatures. Indeed, when the feed of natural gas 10 or 42 to the steam reformer 19 is at a too low temperature, additional heat may have to be provided by the furnace chamber 51, resulting in additional energy consumption and potential damages of the furnace chamber 51 when working at higher temperatures. In the event that the feed of natural gas to the steam reformer 10 or 42 is at a too high temperature, heating by the furnace chamber 51 may result in the natural gas in the tube section 50 reaching a temperature that is higher than that the design temperature of the tubes of the tube section 50, resulting in tubes damages and leakages between the furnace chamber 51 and the tube 50 sections.

In order to maximize the surface area and, hence, the exchange of heat in the heat exchange system 2, the heat exchange system 2 of the disclosure comprises at least two heating coils 4 and 5. The heating coils 4 and 5 afford a good surface area. In addition, the presence of multiple heating coils 4 and 5 allows for the multiple step heating of the feed of natural gas 1 and, thereby, enhances the control of the temperature of the feed of natural gas 10.

Furthermore, the flue gas outlet 21 of the steam reformer 19 is in fluid or thermal communication with the heating coils 4 and 5 of the heat recovery system 3, such that heat is recovered from the flue gas 2 produced in the steam reformer 19 (FIG. 1).

As the temperature of the flue gas 2 in the furnace chamber 51 of the steam reformer 19 is as high as 1000° C., this flue gas 2 is a particularly suitable source of heat to be provided to the heat exchange system 3, in order for heat to be provided to the feed of natural gas 1. In addition, the stack 52 of the steam reformer 19 may be designed to handle temperatures not higher than 150° C. This means that it may be, in any event, necessary to recover the heat of the flue gas 2 before it is sent to the stack 52, through the use of fan (not shown) typically located at the bottom of the steam reformer 19 due to its weight. Therefore, the use of the flue gas 2 for recovering heat in the heat recovering system 3 presents the benefit of ensuring that the temperature of the flue gas 38 going to the stack 52 is not higher than the temperature that the stack 52 has been designed for.

In addition a first heating coil 4 (FIG. 1), is configured for heating the feed of natural gas 1 from a temperature ranging from 10° C. to 40° C. to a temperature ranging from 180° C. to 210° C., thereby providing a pre-heated feed of natural gas 9, and a second heating coil 5 is configured for heating the pre-heated feed of natural gas 9 from a temperature ranging from 180° C. to 210° C. to a temperature ranging from 360° C. to 380° C., thereby providing a heated feed of natural gas 10. The first heating coil 4 is located upstream the second coil 5.

As described above, the presence of multiple heating coils 4 and 5 presents the advantage of enhanced control on the temperature of the feed of natural gas 10 or 42 entering the steam reformer 19. In addition, the pre-heated feed of natural gas 9 can be used as a source of energy supply, for example through heat exchange or mixing with other gases, as will be illustrated in the next embodiment. Hence, the presence of multiple heating coils 4 and 5 also offers the benefit of optimal heat distribution throughout the entire ammonia production system 39.

Reference is made to FIGS. 1, 2 and 4. According to one embodiment of the system of the disclosure, the system further comprises means for splitting 7 the pre-heated feed of natural gas 9 heated by a first heating coil 4 into a pre-heated stream 9 fed to the second heating coil 5 of the heat recovery unit 3 and a gas stream 6 having a temperature ranging from 180° C. to 210° C. used as fuel in the steam reformer 19.

As described above, this is possible to use the pre-heated feed of natural gas 9 as a source of energy supply. By splitting the pre-heated feed of natural gas 9, a gas stream 6 having a temperature ranging from 180° C. to 210° C. can be obtained and that is suitable for feeding to the furnace chamber 51 of the steam reformer 19. Consequently, no separate heating device is required for heating the gas fed as fuel 6 to the furnace chamber 51 of the steam reformer 19. Moreover, the system of the disclosure not only allows for controlling the temperature of the feed gas 10 or 42 to the steam reformer 19, it further allows to obtain a gas stream 6 having a temperature ranging from 180° C. to 210° C. suitable as fuel in the furnace chamber 51 of the steam reformer 19, as well as the control of the temperature of this gas stream 6 having a temperature ranging from 180° C. to 210° C. and used as fuel gas. This may be of particular importance in ammonia production systems 39, comprising steam reformers 19 made of multiple parallel units (not shown), each unit comprising a furnace chamber 51 and a tube section 50: in such systems, a problem that may be faced is the unequal heat distribution between the different units of the steam reformer. Controlling both temperatures of the heated feed of natural gas 10 and of the low temperature gas stream 6 and of the gas stream 40 brings a solution for controlling this problem.

Reference is made to FIG. 4. According to one embodiment of the system of the disclosure, the system further comprises means for mixing 8 the gas stream having a temperature ranging from 180° C. to 210° C. used as fuel 6 in the steam reformer 19 with natural gas. As an extension to the previous embodiment, the system of the disclosure allows for further control of the temperature and of the volume of gas 40 to fed as fuel to the furnace chamber 51 of the steam reformer 19.

Reference is made to FIG. 2. According to one embodiment of the system of the disclosure, the system further comprises:

- a sulfur removal unit 11 for removing sulfur from the feed of natural gas 10 heated by the second heating coil 5, comprising an inlet 12 and an outlet 13;
- a steaming unit 15, having an inlet 16 and outlet 17; and
- a heating unit 41 for heating a natural gas/steam mixture from a temperature ranging from 360° C. to 380° C. to a temperature ranging from 590° C. to 610° C., and comprising an inlet 43 and an outlet 44;

wherein the inlet 12 of the sulfur removal unit 11 is in fluid communication with the outlet 47 of the heat recovery unit, and wherein the inlet 16 of the steaming unit 15 is in fluid communication with the outlet 13 of the sulfur removal unit, and wherein the outlet 17 of the steaming unit 15 is in fluid communication with the inlet of the heating unit 41, and wherein the outlet 44 for the heating unit 41 is in fluid communication with the inlet for the heated feed of natural gas 20 of the steam reformer 19.

This embodiment of the system will enable the person skilled in the art to use the heated feed of natural gas 1 to produce a reformed gas, comprising a mixture of carbon monoxide and hydrogen 22. It will be evident to the person skilled in the art that, optionally, a secondary reformer 53 can be placed incorporated downstream the steam reforming unit 19 and upstream the shift conversion unit 24, for reacting the heated feed of natural gas 10 is reacted with air 54, as a source of oxygen, and thereby further increasing the conversion of the natural gas into the reformed gas 22, comprising hydrogen and carbon monoxide. The gas leaving the secondary reformer 53 can then be fed to the shift conversion unit 24.

Reference is made to FIG. 2. According to one embodiment of the system of the disclosure, the system further comprises:

- a shift conversion unit 24 for reacting carbon monoxide gas produced in the steam reformer 19 with water 48, thereby producing a mixture of carbon dioxide and hydrogen 27, in direct fluid communication with the steam reformer 19;
- a carbon dioxide removal unit 28 in direct fluid communication with the shift conversion unit 27, for separating hydrogen 31 from carbon dioxide in the mixture of carbon dioxide and hydrogen 27 formed in the shift conversion unit 24;
- a methanation unit 32 in direct fluid communication with the carbon dioxide removal unit 28 for converting amounts of carbon monoxide gas formed in the steam reformer 19 and of carbon dioxide formed in the shift conversion unit 24 remaining in the hydrogen gas 31 into methane, thereby providing hydrogen gas 35 essentially free in carbon monoxide and carbon dioxide; and
- an ammonia synthesis unit 36 for reacting the hydrogen gas provided by the methanation unit 32 with nitrogen gas 49, thereby forming ammonia 45, in direct fluid communication with the methanation unit.

This embodiment of the method will enable the person skilled in the art to use the heated feed of natural gas 1 to produce ammonia 45. The supply of nitrogen gas 49 to the ammonia synthesis unit 36, also commonly known as the Haber Bosch synthesis, is necessary in order for the hydrogen gas essentially free in carbon monoxide and carbon dioxide 35 to react with nitrogen 49 in the ammonia synthesis unit 36, thereby producing ammonia 45. Nitrogen gas 49 can be supplied to the ammonia synthesis unit 36 through, for example, an air separation unit (not shown) that splits the oxygen in the air from nitrogen gas 49. Alternatively, if as described in relation to the previous embodiment, a secondary reformer 53 is located downstream the steam reformer 19 and upstream the shift conversion unit 24, nitrogen gas 49 is then supplied to the ammonia synthesis through the air 54 supplied to the secondary reformer 53.

In a third aspect of the disclosure is disclosed the use of the system of the disclosure for heating, according to the method of the disclosure, a feed of natural gas used as feed for a steam reformer of an ammonia production system.

EXAMPLE

Reference is made to FIGS. 1 to 4.

Heat from the flue gas 2 was recovered in the heat recovery system 3. The feed of natural gas 1 was contacted with the first coil 4 and pre-heated to 210° C. to produce the pre-heated feed of natural gas 9. This pre-heated gas stream 9 then was splitted into a gas stream 6 having a temperature ranging from 180° C. to 210° C. used as fuel and a remaining portion of the pre-heated gas stream 9. The pre-heated feed of natural gas 9 then was further heated upon feeding to the second coil 5, thereby yielding a heated feed of natural gas 10 having a temperature of 370° C. The heated feed of natural gas 10 was treated in the sulfur removal unit 11 and subsequently mixed with steam (in a steaming unit) prior to being reacted in the tube section 50 of the steam methane reformer 19, into carbon monoxide and hydrogen, comprised in the reformed gas 22. The fuel gas in the furnace chamber 51 was produced by mixing the gas stream 6 with a portion of the heated feed of natural gas 10, thereby producing the gas stream 40 having a temperature ranging from 150 to 170° C. The reformed gas 22 produced from the steam reformer 19 then was reacted in a secondary reformer 53, in order to produce additional carbon monoxide and hydrogen in the reformed gas 22. The reformed gas 22 was consecutively treated in the shift conversion unit 24, producing a mixture of carbon monoxide and hydrogen 27, in the carbon dioxide removal unit 28, producing the hydrogen gas flow 31, in the methanation unit 32, producing the hydrogen gas stream 35, essentially free in carbon monoxide and carbon dioxide, and in the ammonia synthesis unit 36, thereby producing ammonia 45.

The invention claimed is:

1. A method for heating a feed of natural gas, used as feed for a steam reformer of an ammonia production system, wherein the system comprises a steam reformer operably connected to a heat recovery unit comprising at least two heating coils maintained at a different temperature, wherein the feed of natural gas passes through the at least two heating coils, comprising steps of:

a) recovering heat in the heat recovery unit from flue gas produced in the steam reformer of the ammonia production system; and b) exchanging at least part of the heat recovered in step a) with at least a portion of the feed of natural gas, thereby obtaining a heated feed of natural gas;

wherein the feed of natural gas does not comprise steam; wherein step b) comprises consecutive steps of:

b1) heating the feed of natural gas from a temperature ranging from 10° C. to 40° C. to a temperature ranging from 180° C. to 210° C. upon contacting the feed with a first heating coil of the heat recovery unit, thereby obtaining a pre-heated feed of natural gas; and b2) subsequently further heating the pre-heated feed of natural gas from step b1) to a temperature ranging from 360° C. to 380° C. upon contacting the feed with a second heating coil of the heat recovery unit, thereby obtaining the heated feed of natural gas;

wherein the method further comprises a step c) of splitting the pre-heated feed of natural gas obtained in step b1) into a pre-heated feed stream fed to the second heating coil of the heat recovery unit and a gas stream having a temperature ranging from 180° C. to 210° C. used as fuel in the steam reformer, wherein the gas stream, having a temperature ranging from 180° C. to 210° C., used as fuel in the steam reformer obtained from step c) is further mixed with natural gas.

2. The method according to claim 1, further comprising the steps of:

d) supplying the heated feed of natural gas to a sulfur removal unit, thereby obtaining sulfur-depleted natural gas;

e) mixing the sulfur-depleted natural gas obtained in step d) with steam in a steaming unit, thereby obtaining a natural gas/steam mixture;

f) heating the natural gas/steam mixture obtained in step e) from a temperature ranging 360° C. to 380° C. to a temperature ranging from 590° C. to 610° C. in a heating unit, thereby obtaining a heated natural gas/steam mixture; and g) supplying the heated natural gas/steam mixture obtained in step f) to the steam reformer, thereby forming a reformed gas, comprising at least hydrogen and carbon monoxide.

3. The method according to claim 2, further comprising the steps of:

h) reacting the reformed gas, reformed in the steam reformer in a shift conversion unit, thereby producing a mixture of carbon dioxide and hydrogen;

i) reacting the gas obtained from a reaction in the shift conversion unit in a carbon dioxide removal unit, thereby separating hydrogen from carbon dioxide;

j) reacting the gas obtained from the carbon dioxide removal unit in a methanation unit, thereby converting remaining amounts of carbon monoxide and carbon dioxide in the hydrogen into methane, thereby producing hydrogen gas essentially free in carbon monoxide and carbon dioxide; and k) reacting the gas obtained from a reaction in the methanation unit in an ammonia synthesis unit, thereby producing ammonia.

4. A system for heating a feed of natural gas, used as feed for a steam reformer of an ammonia production system, comprising:

a heat recovery system for recovering heat, comprising an inlet and an outlet and at least two heating coils maintained at a different temperature for exchanging part of the recovered heat with at least a portion of the feed of natural gas, thereby providing a heated feed of natural gas;

a steaming unit, comprising an inlet in fluid communication with the heated feed of natural gas and an outlet; and a steam reformer, comprising an inlet for the heated feed of natural gas in fluid communication with the heated feed of natural gas, and an outlet for a flue gas;

wherein the heat recovery system is positioned upstream the steaming unit;

wherein the flue gas outlet of the steam reformer is in fluid communication with the heating coils of the heat recovery system, such that heat is recovered from the flue gas produced in the steam reformer;

wherein a first heating coil is configured for heating the feed of natural gas from a temperature ranging from 10° C. to 40° C. to a temperature ranging from 180° C. to 210° C., thereby providing a pre-heated feed of natural gas, and a second heating coil is configured for heating the pre-heated feed of natural gas from a temperature ranging from 180° C. to 210° C. to a temperature ranging from 360° C. to 380° C., thereby providing a heated feed of natural gas, and the first heating coil is located upstream the second heating coil; and wherein the system further comprises:

means for splitting the pre-heated feed of natural gas into a pre-heated feed stream fed to the second heating coil of the heat recovery unit and a gas stream having a temperature ranging from 180° C. to 210° C. used as fuel in the steam reformer; and means for mixing the gas stream having a temperature ranging from 180° C. to 210° C. used as fuel in the steam reformer with natural gas.

5. The system according to claim 4, further comprising:

a sulfur removal unit for removing sulfur from the feed of natural gas heated by the second heating coil, comprising an inlet and an outlet;

a steaming unit, having an inlet and an outlet; and a heating unit for heating a natural gas/steam mixture from a temperature ranging from 360° C. to 380° C. to a temperature ranging from 590° C. to 610° C., and comprising an inlet and an outlet;

wherein the inlet of the sulfur removal unit is in fluid communication with the outlet of the heat recovery unit, and wherein the inlet of the steaming unit is in fluid communication with the outlet of the sulfur removal unit, and wherein the outlet of the steaming unit is in fluid communication with the inlet of the heating unit, and wherein the outlet for the heating unit is in fluid communication with the inlet for the heated feed of natural gas of the steam reformer.

6. The system according to claim 4, further comprising:

a shift conversion unit for reacting carbon monoxide gas produced in the steam reformer with water, thereby producing a mixture of carbon dioxide and hydrogen, in direct fluid communication with the steam reformer;

a carbon dioxide removal unit in direct fluid communication with the shift conversion unit, for separating hydrogen from carbon dioxide in the mixture of carbon dioxide and hydrogen formed in the shift conversion unit;

a methanation unit in direct fluid communication with the carbon dioxide removal unit for converting amounts of carbon monoxide gas formed in the steam reformer and of carbon dioxide formed in the shift conversion unit remaining in the hydrogen gas into methane, thereby providing hydrogen gas essentially free in carbon monoxide and carbon dioxide; and an ammonia synthesis unit for reacting the hydrogen gas provided by the methanation unit with nitrogen gas, thereby forming ammonia, in direct fluid communication with the methanation unit.

7. The system according to claim 4, wherein the means for splitting the pre-heated feed of natural gas includes at least one of a pressure release valve, a gas splitter, or a t-tube.

8. The system according to claim 4, wherein the means for mixing the gas stream includes at least one of a pressure release valve, a gas splitter, or a t-tube.

* * * * *